Sept. 5, 1950  M. B. BOWMAN, JR  2,521,280
SIGNAL DEVICE
Filed Feb. 26, 1946
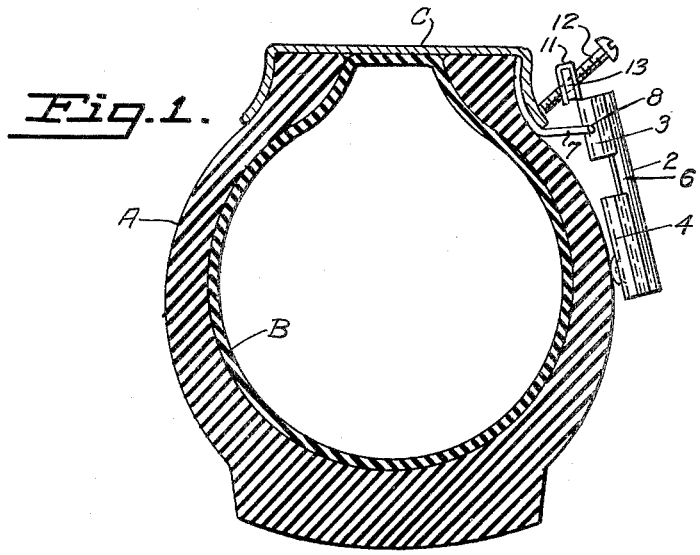
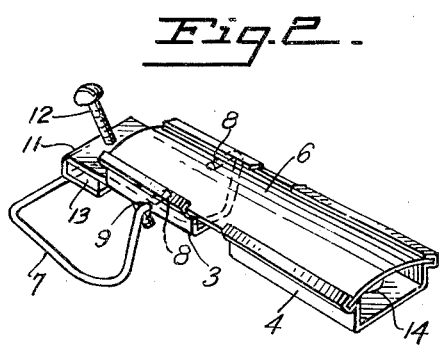
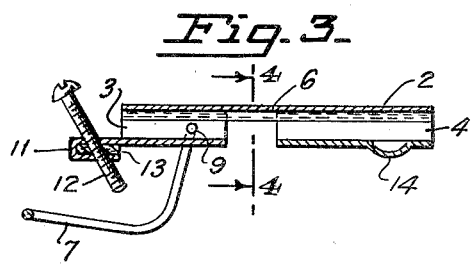
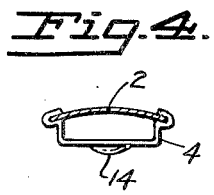
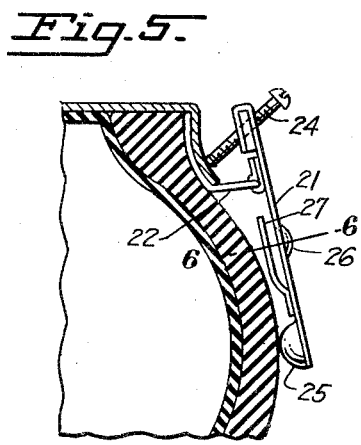
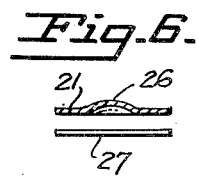
INVENTOR.
MELVILLE BRYANT BOWMAN, JR.
BY
ATTORNEY Patented Sept. 5, 1950

2,521,280

UNITED STATES PATENT OFFICE 2,521,280

SIGNAL DEVICE

Melville Bryant Bowman, Jr., Belvedere, Calif.

Application February 26, 1946, Serial No. 650,227

5 Claims. (Cl. 116—34)

This invention relates to signal devices, and more particularly to devices adapted to be attached to pneumatic automotive tires to warn drivers of deflation thereof below a predetermined point.

An object of the invention is the provision of an audible signal device for tires adapted for actuation when the air pressure in the tire falls below a predetermined pressure.

Further objects are to provide an audible signal device to indicate deflation of pneumatic tires which is adapted to be actuated by tire deflation of only a very few pounds pressure; to provide a tire signal device adapted to produce a relatively high frequency sound signal which is clearly audible to an occupant of an automotive vehicle regardless of road and operation noises; to provide a durable, inexpensive, easy to install device of the character above mentioned which is highly sensitive to variations of pressure in a pneumatic tire, or the like; and to provide an adjustable device, as aforesaid, which may be set for actuation at a predetermined point of tire deflation. Other objects and advantages will be referred to and will be apparent upon reference to the accompanying drawings and specifications.

Reference is made to the drawings, in which similar characters of reference represent corresponding parts in the several views.

Fig. 1 is a sectional view of a conventional automotive pneumatic tire and tire rim and indicating the signal device attached thereto.

Fig. 2 is a perspective view of the device.

Fig. 3 is a longitudinal sectional view of the device.

Fig. 4 is a sectional view, taken on the line 4—4 of Fig. 3.

Fig. 5 is a fragmentary view of a conventional automotive tire and rim and indicating a modification of the invention attached thereto.

Fig. 6 is a sectional view, taken on line 6—6 of Fig. 5.

In the drawings, A indicates, generally, a conventional automotive pneumatic tire casing having a conventional inflatable tube B and mounted on a conventional tire rim C.

The signal device comprises a backing member or sound element 2 formed of a concavo-convex strip of steel or other suitable material (see Fig. 4). The principal characteristic of the strip 2 is that it produces an audible, high frequency signal when flexed beyond a predetermined point. The strip immediately assumes an unflexed position upon termination of applied pressure thereagainst. Preferably, I prefer to employ a strip of clock spring steel of between $5/1000$ of an inch to $8/1000$ of an inch in thickness. I have found that such material will be actuated upon movement of approximately $3/32$ of an inch and will reset itself upon movement of approximately the same distance.

Generally rectangular, hollow housing members 3 and 4 are provided over the concave side 5 of the strip 2 adjacent to opposite ends thereof and are spaced from one another to form the flexion or distortion area 6. The housing members 3 and 4 are crimped to, or otherwise connected to, the edges of the steel strip 2 and serve the dual purpose of stiffening the opposite ends of strip 2 to centralize and define the flexion point 6 and also serve as amplifiers. I have found that the spacing between the surface of the concave side of member 2 and the housing members 3 and 4 is preferably approximately $1/8$ of an inch, in order to produce the most effective signal.

It is further noted that the housing member 3 is provided with holes in the side walls thereof for the reception of the ends of the support member, generally indicated at 7. The support member is preferably formed of wire or other resilient material, bent to form a bail, and wherein the open end of the bail is bent at approximately right angles to the closed portion thereof, as indicated at 8. The ends of the bail or support member 7 are removably and pivotally engaged with the side walls of the housing 3, as at 9.

Housing member 3 carries a projecting U-shaped extension, generally indicated at 11, provided with aligned holes for the reception of a set screw 12. Preferably I insert a fiber block 13 in said U-shaped extension member to act as a nut forming means to coact with screw 12. The screw 12 projects beyond housing 3 to bear against the rim C of the wheel.

It is noted that the closed portion of bail member 7 is inserted between the rim C and tire casing A and is held therein by the pressure of the said tire exerted against the said rim. Preferably, the set screw should be carried in the extension member so that it projects therefrom at an angle of roughly 45° relative to the longitudinal axis of the strip 2.

Housing 4 is formed to provide a rounded protrusion 14 adjacent to the bottom end thereof, which is adapted to ride against the wall of the tire A.

Adjustment of the set screw 12 provides means to adjust the sensitivity of the device. The rider protrusion 14 is fulcrumed against the tire wall and by tightening or loosening the screw the entire backing strip is put under stress and, consequently, proper adjustment of the said screw eliminates all free motion. Hence any additional stress against protrusion 14 by the tire wall will be transmitted immediately and directly to the flexion area 6. Further, the adjusted sensitivity of the device enables it to reset immediately for repeated signal actuation, upon very slight lessening of the pressure against the fulcrum end of the strip 2.

As the tire rotates it flattens out and the walls bulge outwardly adjacent to the point of road contact. Consequently, the device is set for actuation when the tire wall bulges outwardly beyond the usual amount when the tire is properly inflated. If the pressure decreases in the tire the bulge of the tire wall at the point of road contact is increased over normal. Under such conditions the strip 2 is actuated on each complete rotation of the wheel, resulting in intermittent audible signals.

I prefer to mount the device at an angle to the vertical axis of the rotating tire in order that centrifugal force will tend to return the device to set or unflexed position. By this angular manner of mounting the device, the sensitivity, as it relates to resetting after each actuation, is increased.

Fig. 5 illustrates a modified form of the invention, wherein a flat tension steel strip 21 is provided instead of the concavo-convex strip 2. A bail 22 is pivotally attached, as at 23, to one end of the member 21. A set screw 24 is threadably mounted on the end of the member 21. A rounded protrusion 25 is carried at the opposite or bottom end of the member 21 to ride against the tire wall. A depression 26, formed by stamping or other means, is provided in the approximate middle of the member 21 to form a distortion or flexion area. An amplifier member 27 is suitably connected to the under portion of the member 21 and is positioned over and spaced outwardly from the weakened distortion area 26. The modified form of the invention is operated in the same manner as previously described with reference to the concavo-convex device. Housing members may be provided on the modified form of invention, if desired, to supplement or replace the amplifier member 27 and to aid in stiffening the member 21 adjacent to the distortion area thereof.

It is noted that a signal is emitted at the distortion area of strip 2 at the time of flexion and also at the time it resets. Consequently each revolution of the tire produces two high frequency signals.

The following advantages have been noted in the presently described invention:

(1) The sensitivity of the device enables positive actuation at high speeds, due to immediate resetting characteristics of the device and insures actuation on deflation of tires of only a very few pounds. For example, lateral distortion of a tire casing at the point of road contact is increased only about $\frac{3}{32}$ of an inch by loss of pressure of approximately four to six pounds when a tire carries between twenty-five and thirty-five pounds pressure. The entire backing member 2 is under tension and the device is so sensitive to slight tire deflation that it is capable of actuation and resetting when the lateral distortion of the tire wall is only $\frac{3}{32}$ of an inch.

(2) Simplicity of operation, installation and manufacture.

(3) A high frequency signal is emitted which is audible to occupants of noisy truck cabs, and the like.

(4) Two signals are emitted upon each revolution of the wheel.

(5) The device is easily adjustable and positively controllable for predetermined actuation.

(6) A novel and efficient mounting means is provided to mount the device on conventional rims without the necessity of nuts, bolts, or provision of holes, or the like, in the rim.

While the invention has been described in more or less specific detail for purposes of example and clarity of illustration, it is understood that variations, modifications and other changes in details of structure may be made within the spirit of the invention and as limited only by the scope of the appended claims.

I claim:

1. A signal device comprising the combination of a bendable concavo-convex metallic strip and means comprising a pair of amplifiers connected to said strip to define a flexion portion of said strip, said amplifiers being coaxially disposed with respect to one another and longitudinally spaced from one another.

2. A signal device comprising a bendable concavo-convex strip of steel, stiffening members connected to said strip, and spaced from one another to define a medially located flexion area of said strip, said stiffening members attached to said strip along the edges thereof, at least one of said stiffening members comprising sound amplification means.

3. A signal device comprising a bendable, concavo-convex strip of steel, a housing connected to said strip at opposite edges thereof and having a portion spaced from and overlying the concave side of said strip, and a stiffening member spaced from said housing and connected to the strip at opposite edges thereof.

4. A signal device comprising a bendable, concavo-convex strip of steel, a housing connected to said strip at opposite edges thereof and having a portion thereof spaced from and overlying the concave side of said strip, and another housing connected to said strip at opposite edges thereof and spaced from said first named housing, the space between said housing members comprising the flexion portion of said strip.

5. A signal device according to claim 4 and wherein said strip of steel is in the range of $5/1000$ to $8/1000$ of an inch in thickness and a portion of said second named housing overlies and is spaced from the concave side of said strip.

MELVILLE BRYANT BOWMAN, Jr.

REFERENCES CITED

The following references are of record in the file of this patent:

UNITED STATES PATENTS

| Number | Name | Date |
|---|---|---|
| 186,169 | Rowbotham | Jan. 9, 1877 |
| 724,545 | Conklin | Apr. 7, 1903 |
| 1,148,357 | Christophersen | July 27, 1915 |
| 1,291,647 | Langham | Jan. 14, 1919 |
| 1,409,360 | Clarke | Mar. 14, 1922 |
| 1,482,737 | Clarke | Feb. 5, 1924 |
| 1,528,202 | Fuller | Mar. 3, 1925 |
| 1,606,584 | Langham | Nov. 9, 1926 |
| 1,729,619 | Laro | Oct. 1, 1929 |
| 2,273,413 | McCulloch | Feb. 17, 1942 |